US007723863B2

(12) United States Patent
Johnson, Jr. et al.

(10) Patent No.: US 7,723,863 B2
(45) Date of Patent: May 25, 2010

(54) POWER SYSTEMS AND METHODS USING AN UNITERRUPTIBLE POWER SUPPLY TO TRANSITION TO GENERATOR-POWERED OPERATION

(75) Inventors: Robert W. Johnson, Jr., Raleigh, NC (US); Ian T. Wallace, Whitefish Bay, WI (US); Rune Lennart Jonsson, Raleigh, NC (US); David G. Loucks, Coraopolis, PA (US); Timothy Hedquist, Sugar Hill, GA (US)

(73) Assignee: Eaton Corporation, Cleveland, OH (US)

( * ) Notice: Subject to any disclaimer, the term of this patent is extended or adjusted under 35 U.S.C. 154(b) by 238 days.

(21) Appl. No.: 11/780,513

(22) Filed: Jul. 20, 2007

(65) Prior Publication Data
US 2009/0021079 A1    Jan. 22, 2009

(51) Int. Cl.
*H02J 1/10* (2006.01)
*H02J 3/38* (2006.01)
*H02J 9/00* (2006.01)

(52) U.S. Cl. ..................... 307/23
(58) Field of Classification Search .......... 307/23, 307/64–65, 67
See application file for complete search history.

(56) References Cited
U.S. PATENT DOCUMENTS
4,139,807 A    2/1979  Hucker

| 6,134,124 | A   | 10/2000 | Jungreis et al. |
| 6,169,390 | B1  | 1/2001  | Jungreis |
| 7,230,344 | B2  | 6/2007  | Pollack et al. |
| 2001/0022472 | A1 | 9/2001 | Codina et al. |
| 2005/0200205 | A1* | 9/2005 | Winn et al. .......... 307/64 |

OTHER PUBLICATIONS

Invitation to Pay Additional Fees and, Where Applicable, Protest Fee (9 pages) corresponding to International Application No. PCT/IB2008/001893; Mailing Date: Mar. 6, 2009.
MGE—UPS Systems, "UPS Topologies and Standards: Abstract", 3 pages, (Nov. 1, 1999) XP007907031.
International Search Report and Written Opinion (20 pages) corresponding to International Application No. PCT/IB2008/001893; Mailing Date : May 12, 2009.

* cited by examiner

*Primary Examiner*—Fritz M Fleming
*Assistant Examiner*—Carlos Amaya
(74) *Attorney, Agent, or Firm*—Myers Bigel Sibley & Sajovec, P.A.

(57) ABSTRACT

A loss of a power source for a bus is detected. Responsive to detecting the loss of the power source, a voltage is generated on the bus using an uninterruptible power supply (UPS). A generator is transitioned to a desired output state concurrent with generating the voltage on the bus using the UPS. The generator is coupled to the bus responsive to the generator attaining the desired output state. The UPS may be used to provide power to a load connected to the bus while the generator is in transition. For example, detecting the loss of the power source may be preceded by operating a converter of the UPS coupled to the bus as a rectifier and generating the voltage on the bus using the UPS may include operating the converter of the UPS as an inverter.

14 Claims, 8 Drawing Sheets

POWER SYSTEMS AND METHODS USING AN UNITERRUPTIBLE POWER SUPPLY TO TRANSITION TO GENERATOR-POWERED OPERATION

BACKGROUND OF THE INVENTION

The invention relates to power systems and methods and, more particularly, to power systems and methods employing generators.

Power systems for facilities may serve critical, life safety and other types of loads that require high availability. A typical power system for such a facility, therefore, may include an auxiliary generator, such as a diesel-powered engine-generator set, which may supply power to these loads when a primary power source, such as a utility source, fails.

Referring to FIG. 1, a typical power system may include an input breaker 40a configured to couple a load bus 30 to a utility power source 10. Respective breakers 40d, 40e, 40f are used to couple and decouple life safety, essential and non-essential loads 80b, 80c, 80d to and from the load bus 30. Another breaker 40c is configured to couple and decouple a generator 60 to and from the load bus 30. A UPS 50 is coupled and decoupled to and from the load bus 30 by another breaker 40b, such that it may receive power from the utility power source 10 or the load bus 30 depending on the state of the input breaker 40a. In the illustrated system, the UPS 50 is an on-line UPS including an input rectifier 52 having its output coupled to an output inverter 54 by a DC link. The inverter 54 provides AC power to a critical load 80a. A battery 56 is coupled to the DC link and may supply power to the inverter 54 when the AC power delivered to the rectifier 52 fails. A bypass switch 58 may be used to bypass the rectifier 52 and inverter 54. A controller circuit 70, which may include circuitry physically distributed among the various components of the power system, controls operations of the breakers 40a-40f and the generator 60.

Typically, in response to a loss of utility power, the load bus 30 of the system is disconnected from the utility source 10 and the life safety, essential and non-essential loads 80b, 80c, 80d are disconnected from the load bus 30. The engine of the generator 60 is started and accelerated and a field voltage applied to the rotor field windings to regulate the output voltage. The generator 60 typically remains disconnected from the load bus 30 until the generator 60 achieves an output voltage and frequency within acceptable limits. Loads may be selectively connected to the load bus 30 after the generator 60 stabilizes the load bus 30.

Thus, the time required to bring such a generator fully on line may include time required to detect the outage, time required to decouple the load bus from the utility source, time to disconnect the loads from the load bus, time to bring the generator up to an acceptable voltage and frequency, time to connect the generator to the load bus and time to connect loads to the load bus. These operations may take on the order of several seconds, which may negatively affect the availability of certain loads.

SUMMARY OF THE INVENTION

Some embodiments of the present invention provide methods of operating a power system. A loss of a power source for a bus is detected. Responsive to detecting the loss of the power source, a voltage is generated on the bus using an uninterruptible power supply (UPS). A generator is transitioned to a desired output state concurrent with generating the voltage on the bus using the UPS. The generator is coupled to the bus responsive to the generator attaining the desired output state. The UPS may be used to provide power to a load connected to the bus while the generator is in transition. For example, an input converter of the UPS may support a reversed power flow during the transition, such that the bus is powered from a battery or other auxiliary source of the UPS. For example, detecting the loss of the power source may be preceded by operating a converter of the UPS coupled to the bus as a rectifier and generating the voltage on the bus using the UPS may include operating the converter of the UPS as an inverter.

In some embodiments, the bus includes a first bus, and detecting the loss of the power source may be followed by disconnecting the first bus from a second bus that is configured to be connected to the generator. Providing power from the UPS to a load connected to the bus may include providing power from the UPS to a load on the first bus. Coupling the generator to the bus responsive to the generator attaining the desired output state may include coupling the generator to the second bus responsive to transition of the generator to the desired output state and then coupling the first bus to the second bus. A load may be coupled to the second bus following coupling of the generator to the second bus and prior to coupling the first bus to the second bus. In some embodiments, an inverter output of the UPS may be coupled to the bus via a bypass to provide transition power to the bus.

In some embodiments, transitioning the generator to the desired output state concurrent with generating the voltage on the bus using the UPS includes synchronizing the generator with the UPS. For example, the UPS may be used to generate a stable voltage on the bus that can be used to reduce the time required for the generator to synchronize.

In further embodiments, the UPS includes a first UPS, and the method further includes disconnecting a load from the bus responsive to detecting the loss of the power source and powering the disconnected load with a second UPS concurrent with generating the voltage on the bus using the first UPS. The second UPS may include a line-interactive UPS.

Additional embodiments of the present invention provide a power distribution system including a UPS and a generator configured to be coupled to a bus. The system further includes a control circuit operatively coupled to the UPS and the generator and configured to detect a loss of a power source for the bus, to cause the UPS to generate a voltage on the bus responsive to detection of the loss of the power source, to transition a generator to a desired output state concurrent with generating the voltage on the bus using the UPS and to couple the generator to the bus responsive to the generator attaining the desired output state. The control circuit may be configured to cause the UPS to provide power to a load concurrent with transitioning of the generator to the desired output state. For example, in data center applications, the load may include cooling equipment that cools electronic equipment powered by the UPS.

DETAILED DESCRIPTION OF EXEMPLARY EMBODIMENTS

Figure 1:
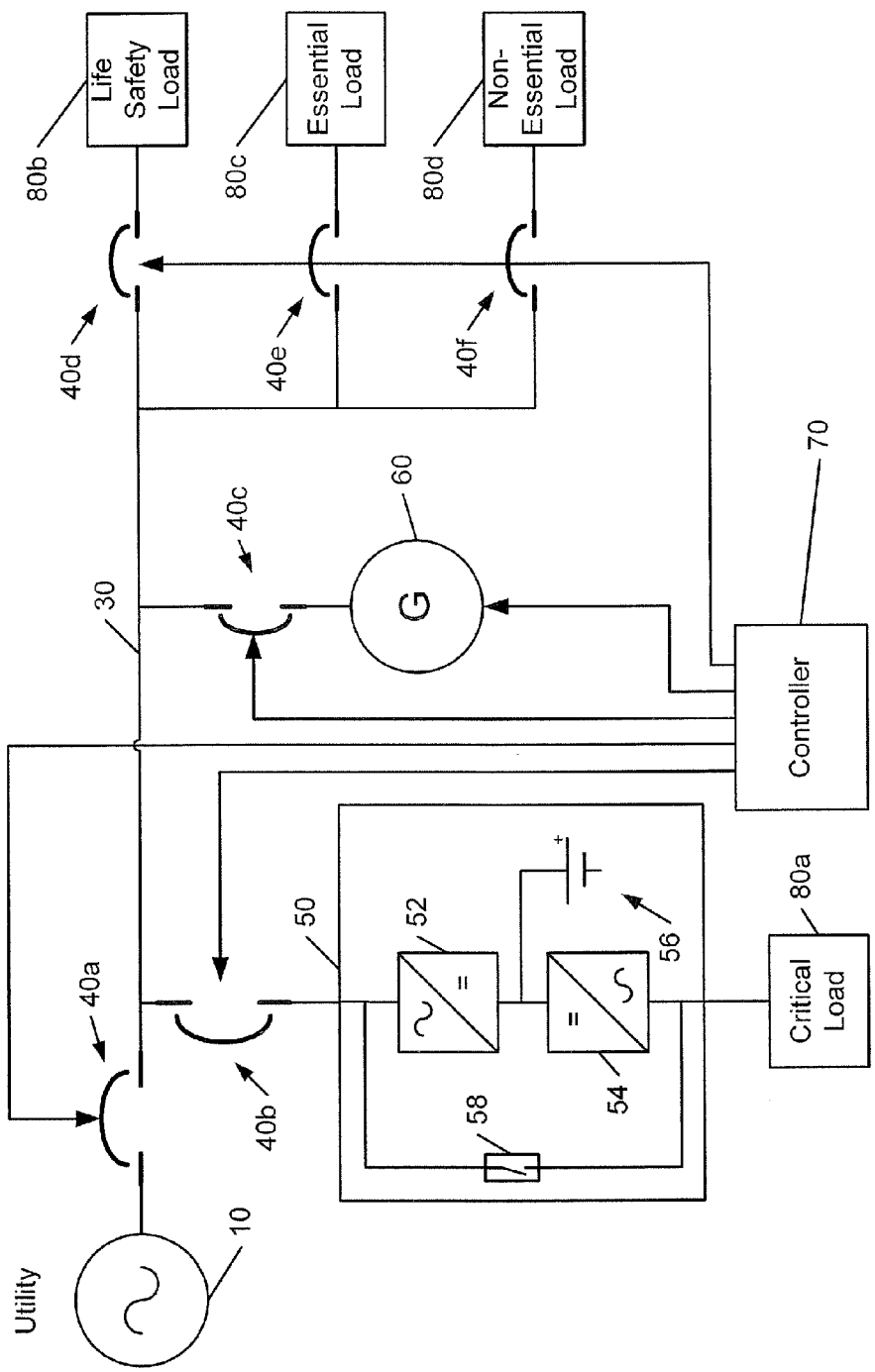
FIG. 1 is a schematic diagram illustrating a conventional power system.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "corrected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "comprises" "includes," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the invention may be embodied as system and methods. Embodiments of the invention may include hardware and/or software. Embodiments of the invention include circuitry configured to provide functions described herein. It will be appreciated that such circuitry may include analog circuits, digital circuits, and combinations of analog and digital circuits.

The invention is described below with reference to block diagrams and/or operational illustrations of systems and methods according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the invention arise from a realization that a UPS that normally powers, for example, a critical load using power received from a load bus may be used to support additional loads, such as life safety loads, until a generator is brought up to speed and coupled to the load bus. For example, a UPS may include a four-quadrant converter coupled to the load bus. The converter may be operated as a rectifier when a utility source is present and may transition to operation as an inverter to drive the load bus when the utility source fails until a generator is being brought online to power the load bus. According to some embodiments, the generator may be synchronized with the UPS. In some embodiments, the UPS may be used to power selected loads on a first bus while the generator is brought up to speed and coupled to other loads on a second bus. The first and second busses may be coupled once the generator stabilizes. In some embodiments, a first UPS may be used to generate a voltage on a load bus to provide a voltage reference for synchronization of a generator, while a second UPS is used to power selected loads, such as life safety loads. In still further embodiments, such as in data center applications, a UPS may be used to provide transitional support to cooling and other support equipment that serves data processing equipment powered by the UPS until a generator comes online.

Figure 2:
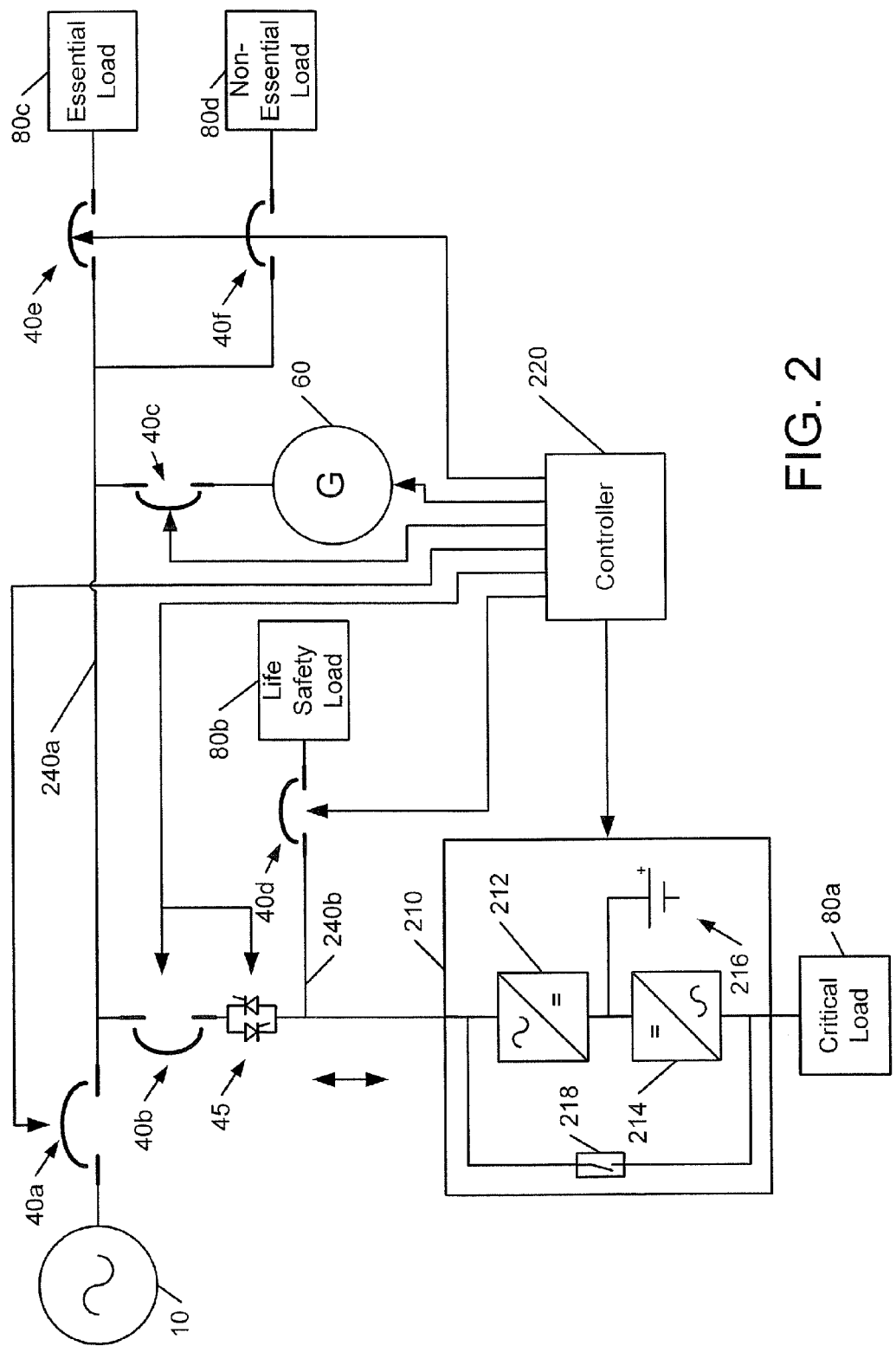
FIG. 2 is a schematic diagram illustrating a power system according to some embodiments of the present invention.

FIG. 2 illustrates a power system according to some embodiments of the present invention. The system includes an input breaker 40a configured to couple and decouple a first bus 240a to and from a utility source 10. A series combination of a breaker 40b and a static switch 45 are configured to couple and decouple a second bus 204b to and from the first bus 240a. A UPS 210 is coupled to the second bus 240b, which is configured to provide power to a life safety load 80b via a breaker 40d. The first bus 240a serves essential and non-essential loads 80c, 80d via respective breakers 40e, 40f. Another breaker 40c is configured to couple and decouple a generator 60 to and from the first bus 240a.

As shown, the UPS 210 has an on-line configuration, including first and second converters 212, 214 joined by a DC link. The second converter 214 may operate as an inverter to provide power to a critical load 80a. A battery 216 is coupled to the DC link, and a bypass switch 218 is configured to bypass the first and second converters 212, 214.

As further illustrated, the UPS 210 may be configured to support power flows to and from the second bus 240b. For example, the first converter 212 may be configured to operate as either a rectifier or an inverter in manner similar to bidirectional converters described in U.S. Pat. No. 6,906,933 to Taimela, which is hereby incorporated by reference in its entirety. In other embodiments, rather than providing and receiving power to and from the second bus 240b using the first converter 212, the bypass circuit 218 may be used to provide power to the first bus 240a using the second converter 214. On-line UPS systems that use a bypass circuit in such a manner to support flexible routing of power flows are discussed, for example, in U.S. Pat. No. 7,050,312 to Tracy et al., which is hereby incorporated by reference.

The UPS 210, generator 60, breakers 40a-40f and static switch 45 are controlled by a controller circuit 220, which may operate responsive to, for example, various parameters (e.g., voltage, current, frequency, phase) of the power system. The controller circuit 220 may be a single unit or may comprise components distributed around the power system. For example, the controller circuit 220 may be integrated with the UPS 210 to provide an integrated backup system. Generally, the controller circuit 220 may be implemented using analog circuitry, digital circuitry (including data processing circuitry executing program code that supports particular functions), or combinations thereof. The controller circuit 220 and devices that interoperate with the controller circuit 220, such as breakers 40a-40f, static switch 45 and circuitry within the UPS 210 and generator 60, may be collectively considered as providing a control circuit that supports functionality described herein with reference to FIGS. 2 and 3.

Figure 3:
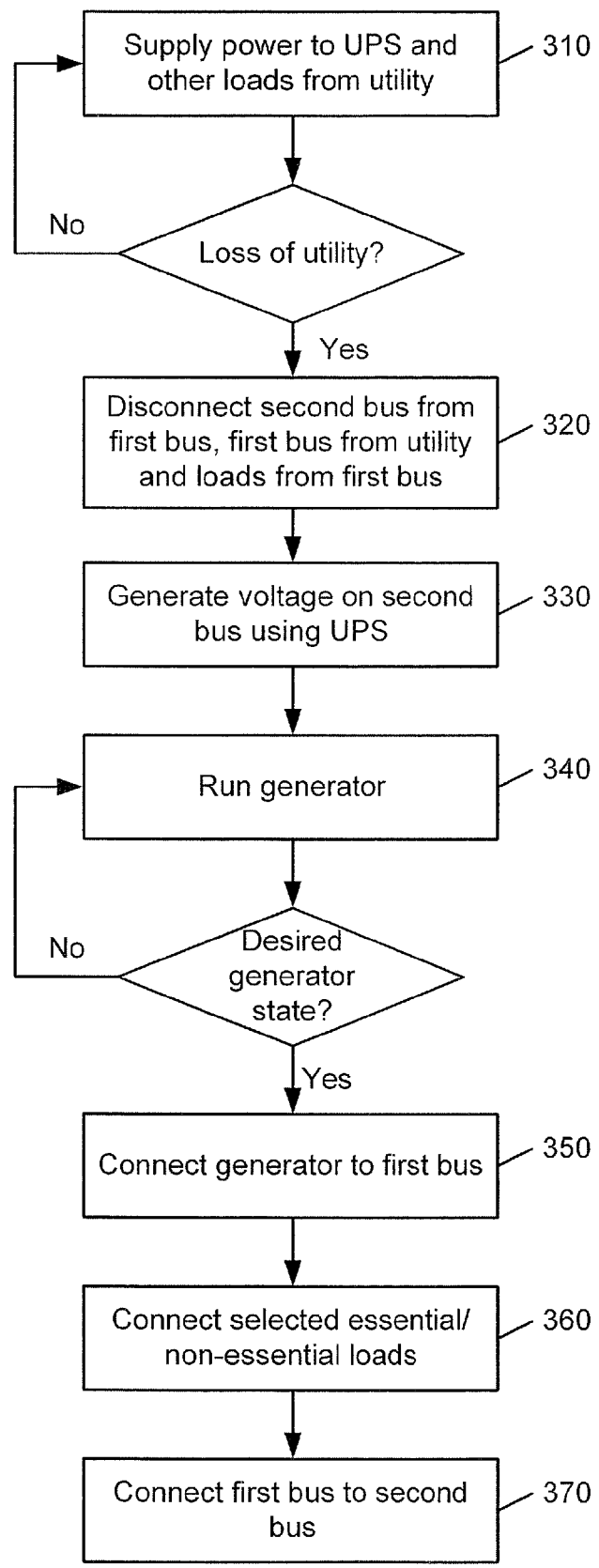
FIG. 3 is a flowchart illustrating exemplary operations of the power system of FIG. 2 according to some embodiments of the present invention.

FIG. 3 illustrates exemplary operations of the system of FIG. 2 according to some embodiments of the present invention. It will be appreciated that these operations may be implemented by interoperation of the controller circuit 220 and various ones of the UPS 210, generator 60, breakers 40a-40f and static switch 45. Power is supplied to the UPS 210 and the life safety, essential and non-essential loads 80b, 80c, 80d from the utility source 10 (Block 310). In this mode, the first converter 212 of the UPS 210 may operate as a rectifier to provide power to the second converter 214 and/or the battery 216. Upon detection of a loss of the utility source 10, the UPS 210 and the second bus 240b are disconnected from the first bus 240a by action of the static switch 45 and breaker 40b, the first bus 240a is disconnected from the utility source 10 by the input breaker 40a and the essential and non-essential loads 80c, 80d are decoupled from the first bus 240a by opening their respective breakers 40e, 40f (block 320). The UPS 210 may then change operating modes, using the first converter 212 as an inverter powered by the battery 216 to generate an AC voltage on the second bus 240b concurrent with the second converter 214 continuing to supply power to the critical load 80a (block 330). The generator 60 is started and begins to run up to speed (block 340). Responsive to the generator 60 reaching a desired state, e.g., a desired frequency, voltage and/or phase, the generator 60 is connected to the first bus 240a (block 350). Following this, all or some of the essential and non-essential loads 80c, 80d may be connected to the first bus 240a (block 360). After stabilization of the first bus 240a, the second bus 240b may be reconnected to the first bus 240a (block 370). The UPS 210 may then return to its pre-fault mode of operation.

The manner in which the generator 60 and UPS 210 are synchronized for connection of the first and second busses 240a, 240b may vary. For example, in some embodiments, the generator 60 may be synchronized to the voltage produced by the UPS 210 on the second bus 240b, for example, by sensing this voltage to generate a frequency/phase reference signal and/or by using a reference signal generated by the UPS 210. In some embodiments, the generator 60 may be brought up to speed and coupled to the first bus 240a independently of the voltage on the second bus 240b generated by the UPS 210, after which the output frequency/phase of the generator 60 and/or the UPS 210 may be adjusted to achieve phase/frequency alignment before coupling the first and second busses 240a, 240b.

It will be appreciated that the circuit configuration and operations thereof described with reference to FIGS. 2 and 3 may be varied within the scope of the present invention. For example, all or some of the functions of the breakers 40a-40f and/or static switch 45 may be provided by other switching devices and/or combinations of switching devices, such as contactors or automatic transfer switches.

Figure 4:
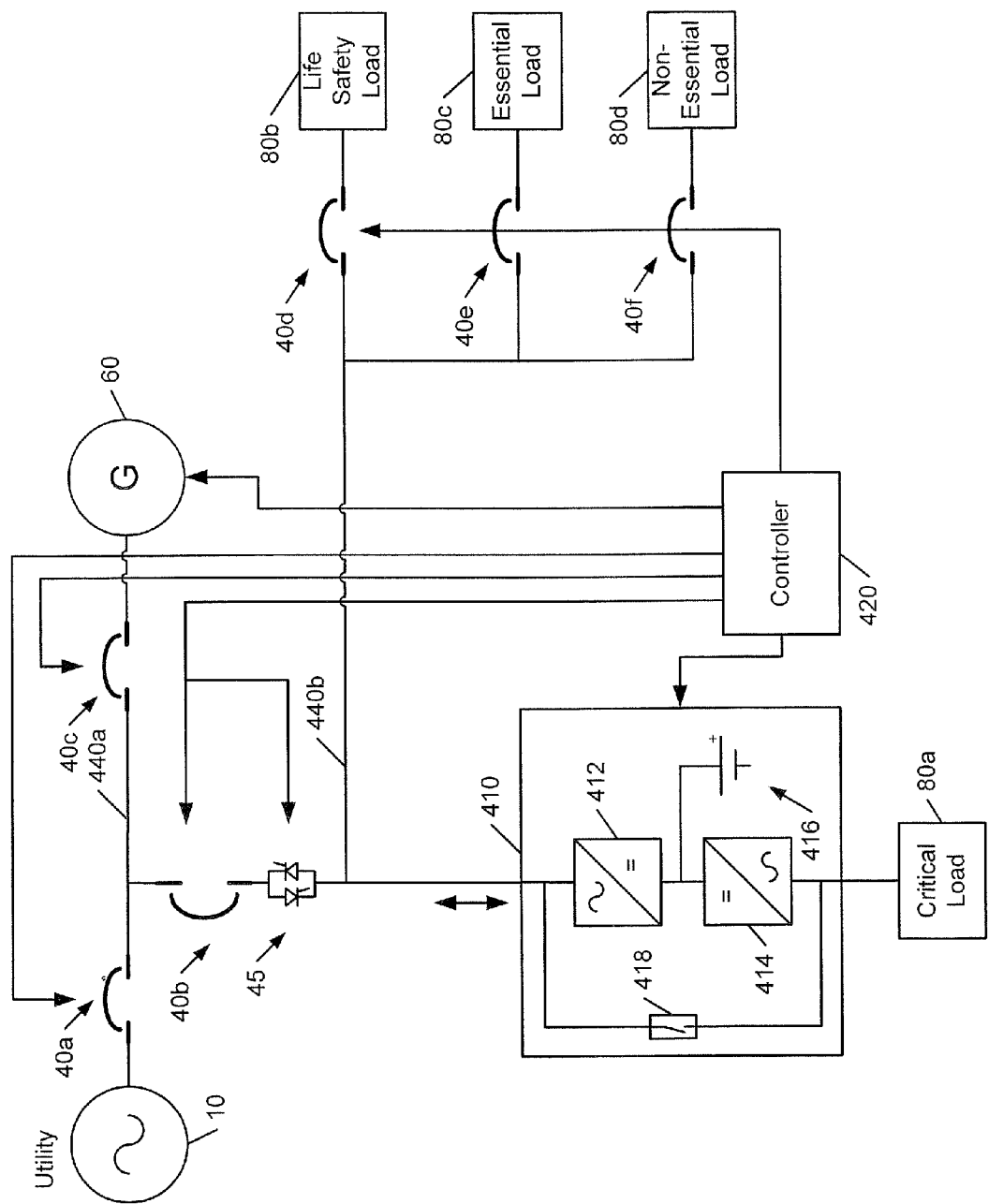
FIG. 4 is a schematic diagram illustrating a power system according additional embodiments of the present invention.

FIG. 4 illustrates a power system according to further embodiments of the present invention. The system includes an input breaker 40a configured to couple and decouple a first bus 440a to and from a utility source 10. A second breaker 40b and a static switch 45 are configured to couple and decouple a second bus 440b to and from the first bus 440a. The second bus 440b is configured to provide power to life safety, essential and non-essential loads 80b, 80c, 80d via respective breakers 40d, 40e, 40f. A UPS 410, which serves a critical load 80a, is coupled to the second bus 440b. Another breaker 40c is configured to couple and decouple a generator 60 to and from the first bus 440a. The UPS 410 has an online configuration, including first and second converters 412, 414, a battery 416 and bypass switch 418. The UPS 410 may be configured to support bidirectional power flows in a manner similar to that described above with reference to the UPS 210 of FIG. 2.

The UPS 410, generator 60, breakers 40a-40f and static switch 45 are controlled by a controller circuit 420, which may operate responsive to, for example, various parameters (e.g., voltage, current, frequency, phase) of the power system. The controller circuit 420 may be a single unit or may comprise components distributed around the power system. For example, the controller circuit 420 may be integrated with the UPS 410 to provide an integrated backup system. Generally, the controller circuit 420 may be implemented using analog circuitry, digital circuitry (including data processing circuitry executing program code that supports particular functions), or combinations thereof. The controller circuit 420 and devices that interoperate with the controller circuit 420, such as breakers 40a-40f, static switch 45 and circuitry within the UPS 410 and generator 60, may be collectively considered as providing a control circuit that supports functionality described herein with reference to FIGS. 4 and 5.

Figure 5:
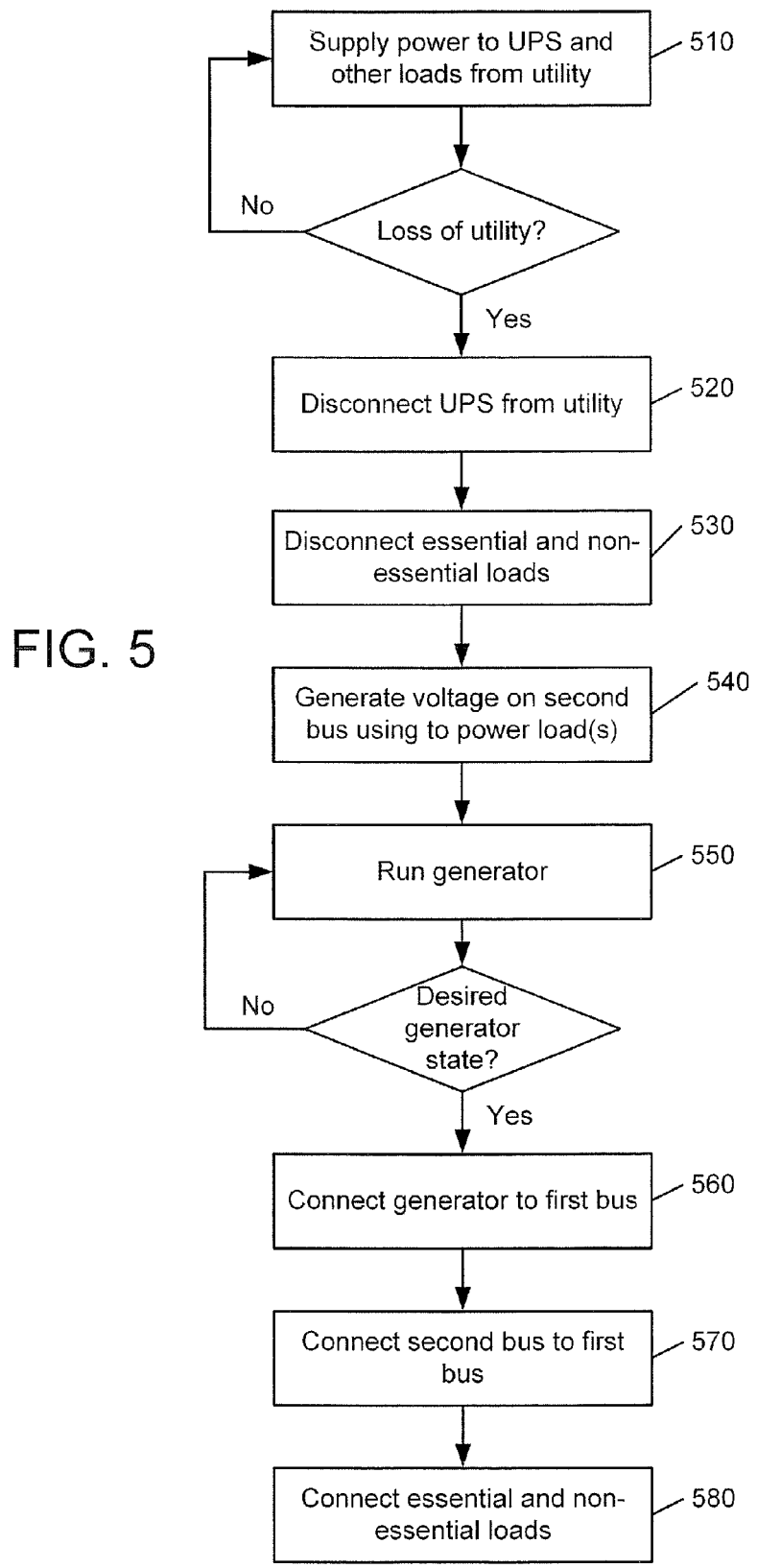
FIG. 5 is a flowchart illustrating exemplary operations of the power system of FIG. 4 according to some embodiments of the present invention.

FIG. 5 illustrates exemplary operations of the system of FIG. 4 according to some embodiments of the present invention. It will be appreciated that these operations may be implemented by interoperation of the controller circuit 420 and various ones of the UPS 410, generator 60, breakers 40a-40f and static switch 45. Power is supplied to the UPS 410 and the life safety, essential and non-essential loads 80b, 80c, 80d from the utility source 10 (Block 510). In this mode, the first converter 412 of the UPS 410 may operate as a rectifier to provide power to the second converter 414 and/or the battery 416. Upon detection of a loss of the utility source 10, the second bus 440b (and UPS 410) is disconnected from the first bus 440a by action of the static switch 45 and breaker 40b, and the first bus 440a is disconnected from the utility source 10 by action of the input breaker 40a (block 520). All or some of the essential and non-essential loads 80c, 80d may also be disconnected from the second bus 440b (block 530). The UPS 410 may then change operating modes, using the first converter 412 as an inverter powered by the battery 416 to generate an AC voltage on the second bus 440b to power the life safety load 80b and any remaining essential or non-essential loads 80c, 80d concurrent with the second converter 414 continuing to supply power to the critical load 80a (block 540). The generator 60 is started and begins to run up to speed (block 550). Responsive to the generator 60 reaching a desired output state, e.g., a desired frequency and/or phase, the generator 60 is connected to the first bus 440a (block 560). The second bus 440b may then be connected to the first bus 440a by action of the breaker 40b and static switch 45 (block 570), after which additional essential and non-essential loads 80c, 80d may be reconnected (block 580). The UPS 410 may return to its pre-fault mode of operation.

It will be appreciated that the circuit configuration and operations thereof described with reference to FIGS. 4 and 5 may be varied within the scope of the present invention. For example, all or some of the functions of the breakers 40a-40f and/or static switch 45 may be provided by other switching devices and/or combinations of switching devices, such as contactors or automatic transfer switches.

Figure 6:
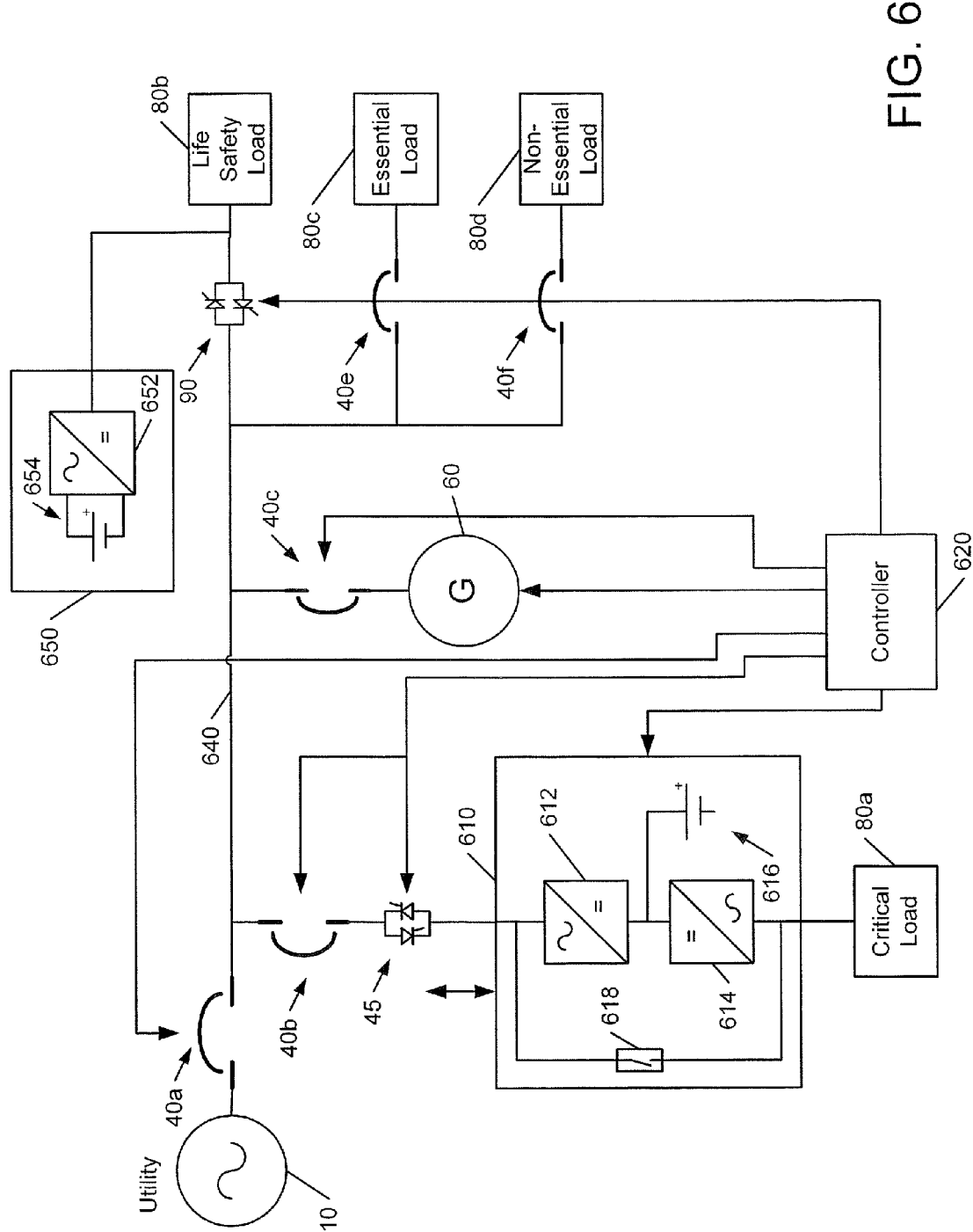
FIG. 6 is a schematic diagram illustrating a power system according to further embodiments of the present invention.

FIG. 6 illustrates a power system according to further embodiments of the present invention. The system includes an input breaker 40a configured to couple and decouple a bus 640 to and from a utility source 10. The bus 640 is configured to provide power to life safety, essential and non-essential loads 80b, 80c, 80d via, respectively, a static switch 90 and respective breakers 40e, 40f. A series combination of a breaker 40b and a static switch 45 are configured to couple and decouple a UPS 610 to and from the bus 640. A second, line-interactive UPS 650 is coupled to the life safety load 80b, and includes a bidirectional converter 652 and a battery 654. The second UPS 650 may provide backup power to the life safety load 80b in response to a loss of power on the bus 640 and/or the opening of the static switch 90. Another breaker 40c is configured to couple and decouple a generator 60 to and from the bus 640. The first UPS 610 has an online configuration, including first and second converters 612, 614, a battery 616 and a bypass switch 618. The first UPS 610 may be configured to support bidirectional power flows in a manner similar to that described above with reference to the UPS 210 of FIG. 2.

The UPS 610, breakers 40a, 40b, 40c, 40e, 40f, generator 60 and static switches 45, 90 are controlled by a controller circuit 620, which may operate responsive to, for example, various parameters (e.g., voltage, current, frequency, phase) of the components of the power system. The controller circuit 620 may be a single unit or may comprise components distributed around the power system. For example, the controller circuit 620 may be integrated with the UPS 610 to provide an integrated backup system. Generally, the controller circuit 620 may be implemented using analog circuitry, digital circuitry (including data processing circuitry executing program code that supports particular functions) or combinations thereof. The controller circuit 620 and devices, such as breakers 40a, 40b, 40c, 40e, 40f, static switches 45, 90 and circuitry within the UPS 610 and generator 60 that interoperate with the controller circuit 620 may be collectively considered as providing a control circuit that supports functionality described herein with reference to FIGS. 6 and 7.

Figure 7:
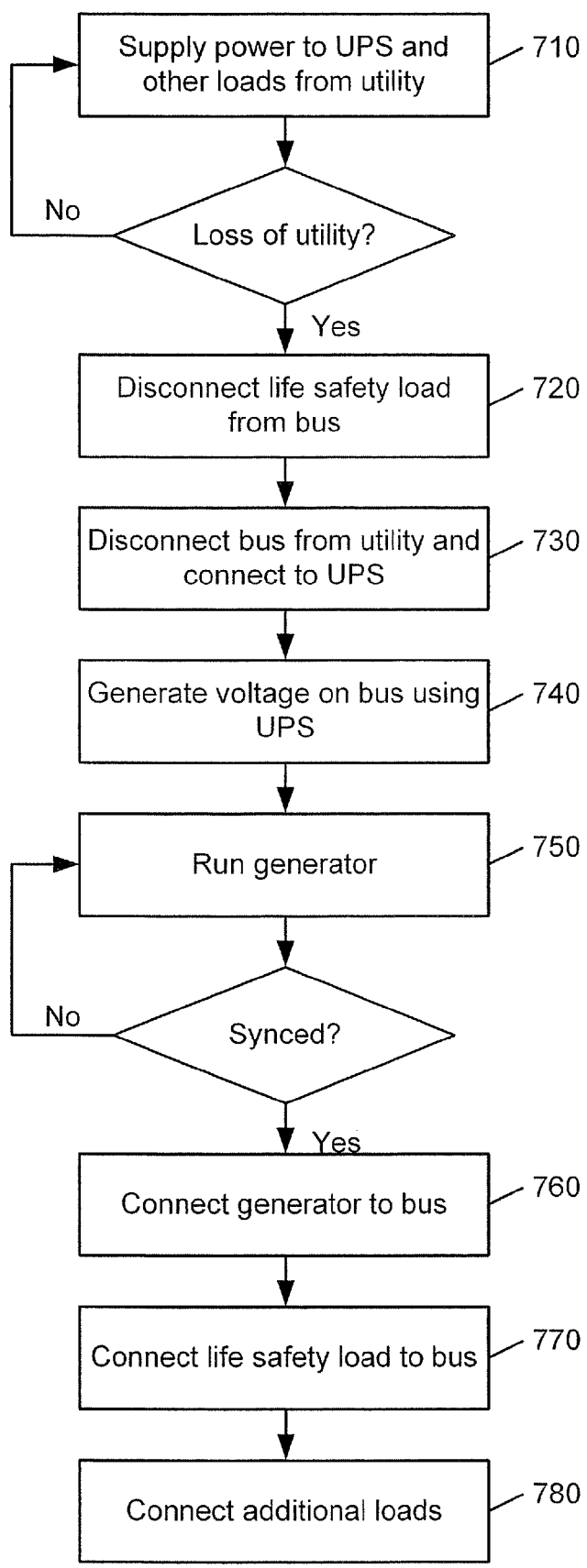
FIG. 7 is a flowchart illustrating exemplary operations of the power system of FIG. 6 according to some embodiments of the present invention.

FIG. 7 illustrates exemplary operations of the system of FIG. 6 according to some embodiments of the present invention. It will be appreciated that these operations may be implemented by interoperation of the controller circuit 620 and various ones of the UPSs 610, 650, generator 60, breakers 40a, 40b, 40c, 40e, 40f and static switches 45, 90. Power is supplied to the UPS 610 and the life safety, essential and non-essential loads 80b, 80c, 80d from the utility source 10 (Block 710). In this mode, the first converter 612 of the UPS 610 may operate as a rectifier to provide power to the second converter 614 and/or the battery 616. Upon detection of a loss of the utility source 10, the life safety load 80b is disconnected from the bus 640 by action of the static switch 90 (block 720). The load bus 640 is disconnected from the utility source 10 and the UPS 610 connected to the load bus 640 by action of the breakers 40a, 40b (block 730). All or some of the essential and non-essential loads 80c, 80d may be shed at this point. The UPS 610 may be used to generate a voltage on the bus 640 along the lines discussed above (block 740). The generator 60 is started and brought up to speed until it reaches synchronization with the voltage on the bus 640 (block 750). The generator 60 may use the stable voltage generated on the bus 640 by the UPS 610 as a synchronization reference. Upon reaching synchronization, the generator 60 may be connected to the bus 640 (block 760). After the generator 60 stabilizes, the life safety load 80b may be reconnected to the bus 640 (block 770). Additional essential and non-essential loads 80c, 80d may be connected, as permitted by the capacity of the generator 60 (block 780).

It will be appreciated that the circuit configuration and operations thereof described with reference to FIGS. 6 and 7 may be varied within the scope of the present invention. For example, all or some of the functions of the breakers 40a-40c, 40e-40f and/or static switches 45, 90 may be provided by other switching devices and/or combinations of switching devices, such as contactors or automatic transfer switches.

Still further embodiments of the present invention arise from a realization that approaches along the lines discussed above may be used in data center and similar applications to provide transitional power for important support equipment, such as cooling equipment. In particular, with the increasing power density of server farms and other data centers, thermal management has become an increasing important issue. For example, if power for the cooling system of a data center is lost, equipment still being powered by a UPS may quickly overheat, which may cause damage and equipment failure.

Figure 8:
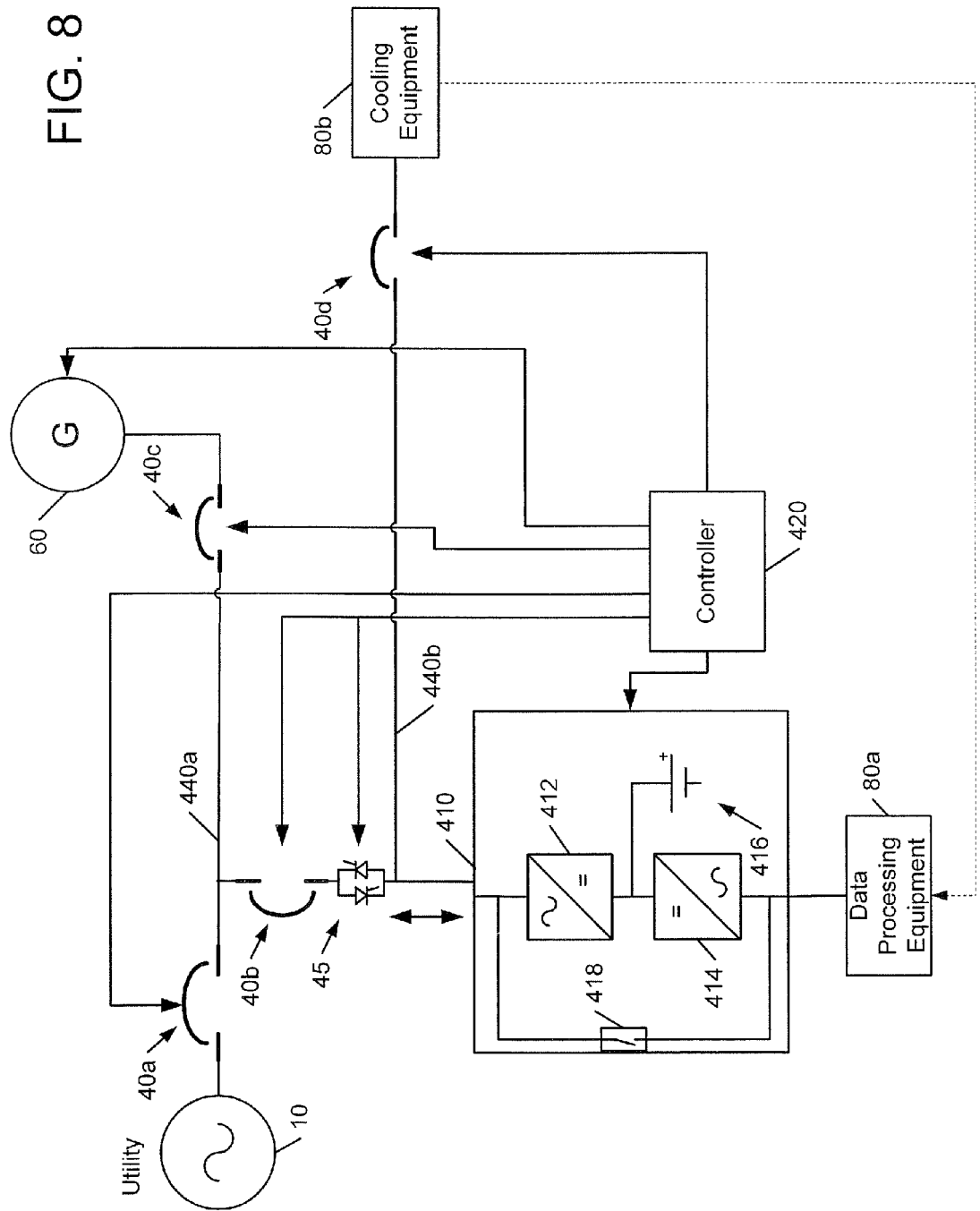
FIG. 8 is a schematic diagram illustrating a data center power system according to still further embodiments of the present invention.

An exemplary approach for providing transition power for cooling of data center or other types of equipment according to some embodiments of the present invention is illustrated in FIG. 8. In particular, a power system for a data center application may be configured along the lines of the power system of FIG. 4, with like components of FIGS. 4 and 8 indicated with like numerals. A UPS 410 may be used to provide uninterrupted power to critical data processing equipment 80a. Upon failure of a utility source 10, a static switch 45 and breaker 40b may operate to disconnect a first bus 440a from a second bus 440b that supplies power via a breaker 40d to data processing cooling equipment 80b that cools the data processing equipment 80a. The first bus 440a is disconnected from the utility source 10 by action of a breaker 40a, after which a generator 60 is started. The UPS 410 may provide power to the cooling equipment load 80b while the generator 60 is brought on line by closing a breaker 40c, after which the first and second busses 440a, 440b are connected such that the generator 60 may be used to provide power to the UPS 410 and the cooling equipment load 80b. It will be appreciated that approaches similar to those described above with reference to FIGS. 2, 3, 6 and 7 may be used, e.g., cooling equipment for a critical data processing load served by a UPS may be transitionally powered by the UPS in a manner similar to the provision of power to life safety loads described for these embodiments.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of operating a power system, the method comprising:

detecting a loss of a power source that supplies power to an uninterruptible power supply (UPS) and load via a first bus;

responsive to detecting the loss of the power source, disconnecting the first bus from a second bus that connects the first bus to the lost power source;

generating a voltage on the first bus using the UPS to thereby provide power from the UPS to the load;

transitioning a generator to a desired output state concurrent with generating the voltage on the first bus using the UPS; and coupling the generator to the first bus via the second bus responsive to the generator attaining the desired output state to enable power transfer from the generator to the UPS and the load.

2. The method of claim 1, wherein the load comprises cooling equipment that cools electronic equipment served by the UPS.

3. The method of claim 1, wherein coupling the generator to the first bus via the second bus responsive to the generator attaining the desired output state comprises:

coupling the generator to the second bus responsive to transition of the generator to the desired output state; and then coupling the first bus to the second bus.

4. The method of claim 3, further comprising coupling a load to the second bus following coupling of the generator to the second bus and prior to coupling the first bus to the second bus.

5. The method of claim 1, wherein transitioning the generator to the desired output state concurrent with generating the voltage on the first bus using the UPS comprises synchronizing the generator with the UPS.

6. The method of claim 1:

wherein detecting the loss of the power source is preceded by operating a converter of the UPS coupled to the first bus as a rectifier; and wherein generating the voltage on the first bus using the UPS comprises operating the converter of the UPS as an inverter.

7. The method of claim 1, wherein generating the voltage on the first bus using the UPS comprises coupling an inverter output of the UPS to the bus via a bypass.

8. The method of claim 1, further comprising providing power to a critical load connected to the UPS concurrent with generating the voltage on the first bus using the UPS.

9. A power distribution system comprising:

a first bus;

a UPS configured to be coupled to the first bus;

a second bus configured to be coupled to the first bus to provide power from a power source to the UPS and a load via the first bus;

a generator configured to be coupled to the second bus; and a control circuit operatively coupled to the UPS and the generator and configured to detect a loss of the power source, to disconnect the first bus from the second bus responsive to detection of the loss of the power source, to cause the UPS to generate a voltage on the first bus responsive to detection of the loss of the power source to thereby provide power from the UPS to the load, to transition the generator to a desired output state concurrent with generating the voltage on the first bus using the UPS and to couple the generator to the first bus via the second bus responsive to the generator attaining the desired output state to enable power transfer from the generator to the UPS and the load.

10. The system of claim 9, wherein the load comprises cooling equipment that cools electronic equipment powered by the UPS.

11. The system of claim 9, wherein the control circuit is configured to couple the generator to the second bus responsive to the generator attaining the desired output state and to subsequently couple the first bus to the second bus.

12. The system of claim 9, wherein the control circuit is configured to couple a load to the second bus following coupling of the generator to the second bus and prior to coupling the first bus to the second bus.

13. The system of claim 9, wherein the control circuit is configured to synchronize the generator responsive to the voltage generated on the first bus by the UPS.

14. The system of claim 9, wherein the control circuit is configured to operate a converter of the UPS as a rectifier prior to detecting the loss of the power source and to operate the converter of the UPS as an inverter to generate the voltage on the first bus using the UPS.

* * * * *

UNITED STATES PATENT AND TRADEMARK OFFICE
CERTIFICATE OF CORRECTION

PATENT NO. : 7,723,863 B2  Page 1 of 1
APPLICATION NO. : 11/780513
DATED : May 25, 2010
INVENTOR(S) : Johnson, Jr. et al.

It is certified that error appears in the above-identified patent and that said Letters Patent is hereby corrected as shown below:

On Title Page:
Item 54, Title: Please correct "UNITERRUPTIBLE"
to read -- UNINTERRUPTIBLE --

Column 1, Line 2: Please correct "UNITERRUPTIBLE"
to read -- UNINTERRUPTIBLE --

Signed and Sealed this

Twenty-sixth Day of October, 2010

David J. Kappos
*Director of the United States Patent and Trademark Office*